United States Patent [19]
Kim et al.

[11] Patent Number: 5,774,321
[45] Date of Patent: Jun. 30, 1998

[54] POWER SUPPLY CIRCUIT WITH LOAD PROTECTION FUNCTION

[75] Inventors: Yong-Ho Kim, Seoul; Young-Sik Lee, Kyungki-do, both of Rep. of Korea

[73] Assignee: Samsung Electronics Co., Ltd., Suwon, Rep. of Korea

[21] Appl. No.: 706,018

[22] Filed: Aug. 30, 1996

[30]     Foreign Application Priority Data

Aug. 30, 1995 [KR] Rep. of Korea .................. 27623/1995
Nov. 11, 1995 [KR] Rep. of Korea .................. 40872/1995

[51] Int. Cl.$^6$ .................................................. H02H 3/00
[52] U.S. Cl. ............................................. 361/94; 361/58
[58] Field of Search ......................... 361/18, 54, 56–58, 361/78, 79, 86, 87, 88, 89, 93, 94, 95–98, 100, 101

[56]             References Cited

U.S. PATENT DOCUMENTS 4,363,068  12/1982  Burns ........................................ 361/91
4,962,350  10/1990  Fukuda ..................................... 361/18

Primary Examiner—Ronald W. Leja
Attorney, Agent, or Firm—Marger, Johnson, McCollom & Stolowitz, PC

[57]             ABSTRACT

A power supply circuit interrupts power to a load in response to a short-circuit or an open-circuit condition and automatically restores power after a momentary short-circuit. A short-circuit detector monitors the current flowing through the load and generates a short-circuit signal if the current exceeds a predetermined level. An open-circuit detector monitors the load voltage and generates an open-circuit signal if the voltage exceeds a predetermined level. A latch converts the short-circuit signal to a latch signal. A logic unit combines the latch signal with the open-circuit signal and a pulse signal from a pulse generator to generate a drive signal. A driver uses the drive signal to control a switch which is connected between the power source and the load to interrupt power to the load. During a short-circuit, a timer generates a periodic pulse signal that toggles the latch signal and intermittently restarts the power to the load. If the short-circuit was of short duration, power is restored to the load. If the short-circuit persists, the power supply circuit continues to intermittently restore power to the load until the short-circuit is removed. The logic unit also generates a fault signal in response to the latch signal and the open-circuit signal. A display unit generates a visual alarm in response to the fault signal to indicate an abnormal state.

10 Claims, 5 Drawing Sheets

POWER SUPPLY CIRCUIT WITH LOAD PROTECTION FUNCTION

This application corresponds to Korean Patent Applications No. 95-27623 filed Aug. 30, 1995 and No. 95-40872 filed Nov. 11, 1995, both in the name of Samsung Electronics Co., Ltd., which are herein incorporated by reference.

BACKGROUND OF THE INVENTION

1. Field of the Invention

This invention relates generally to power supply circuits with load prevention functions and more particularly to a power supply circuit that interrupts power to a load during a short-circuit or an open-circuit condition, and automatically restarts after a short-circuit condition if the short-circuit was only momentary.

2. Description of the Related Art

Power supply circuits often include a switching device connected between a power source and a load to control the flow of power from the power source to the load. However, in a fault condition such as when the load is short-circuited and/or open-circuited, the switching device may be destroyed or the load may be damaged. Thus, it is necessary to protect the switching device from being destroyed due to over current, open-circuits or the like.

FIG. 6 is a block diagram of a power supply circuit which interrupts the current flowing through a load when the load is short-circuited. The circuit of FIG. 6 includes an interrupt circuit 20 which is connected between a power source 3 and a load circuit 4 which includes a switching device 20(a) for connecting or disconnecting the load 4 from the power source 3. A current sensing device Rd is connected between the power source and the load circuit for detecting the amount of current flowing through the load. A short-circuit protection controller 21 causes the interrupt circuit 20 to interrupt the flow of power from the power source to the load when an over current condition is detected.

One problem with the circuit of FIG. 6 is that it only protects against short-circuited loads, but does not protect against open-circuit conditions.

Another problem with the prior art circuit of FIG. 6 is that, in the case of an instantaneous short-circuit having a very short time duration, the power supply circuit continuously interrupts the flow of power from the power source to the load until an operator intervenes and restarts the supply of power.

Accordingly, a need remains for a power supply control circuit which overcomes the above-mentioned problems.

SUMMARY OF THE INVENTION

It is, therefore, an object of the invention interrupt the flow of power from a power source to a load in response to an open-circuit or a short-circuit condition.

Another object of the invention is to automatically restart the flow of power to a load after a momentary short-circuit.

A further object of the invention is to provide a visual indication of a short-circuit or an open-circuit condition.

One aspect of the present invention is a power supply circuit comprising: a short-circuit detector coupled to the load to monitor the current flowing through the load, the short-circuit detector generating a short-circuit signal when the current flowing through the load exceeds a predetermined level; a timer that generates a timer signal; a latch coupled to the short-circuit detector and the timer, the latch generating a latch signal responsive to the short-circuit signal and periodically toggling the latch signal responsive to the timer signal after the short-circuit signal is generated; and a switch coupled to the power source to control the flow of power to the load responsive to the latch signal.

The circuit further includes: a pulse generator that generates a periodic pulse signal; and a logic unit coupled to the pulse generator and the latch, the logic unit generating a drive signal for driving the switch responsive to the pulse signal and the latch signal.

An open-circuit detector coupled to the load monitors the load voltage and generates an open-circuit signal when the load voltage exceeds a predetermined level. A logic unit coupled to the open-circuit detector and the latch generates a drive signal for driving the switch responsive to the open-circuit signal and the latch signal.

Another aspect of the present invention is a method of controlling power to a load comprising: supplying power to the load; monitoring the current flowing through the load; generating a short-circuit signal when the current flowing through the load exceeds a predetermined level; latching the short-circuit signal to generate a latch signal; interrupting power to the load responsive to the latch signal; and restoring power to the load after a first period of time.

The length of the first period of time can be determined by generating a clock signal having pulses; and counting a predetermined number of the clock signal pulses. The method further includes: monitoring the load voltage; generating an open-circuit signal when the load voltage exceeds a predetermined level; and interrupting power to the load responsive to the open-circuit signal.

The foregoing and other objects, features and advantages of the invention will become more readily apparent from the following detailed description of a preferred embodiment of the invention which proceeds with reference to the accompanying drawings.

DETAILED DESCRIPTION

Figure 1:
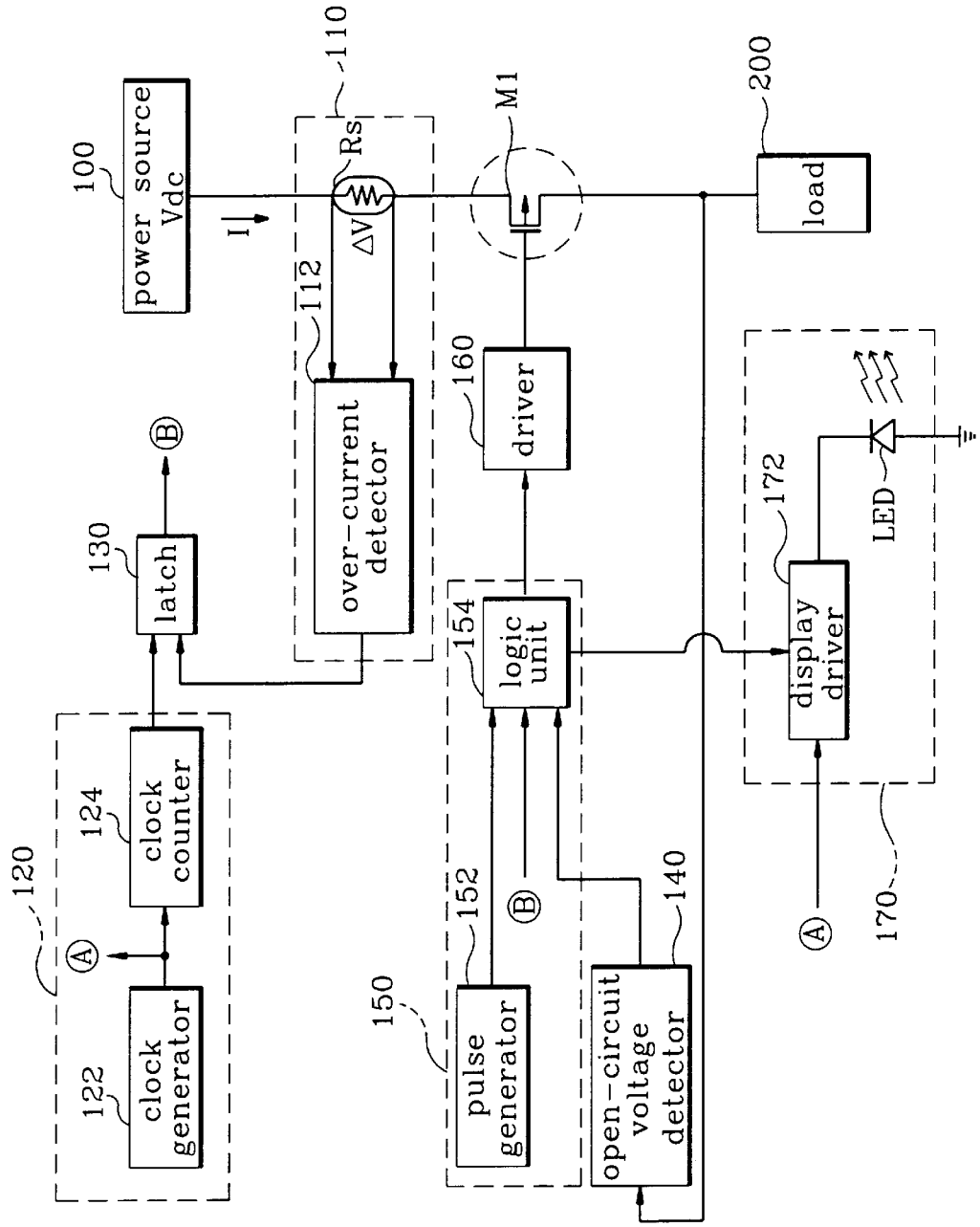
FIG. 1 is a block diagram of an embodiment of a power supply circuit in accordance with the present invention.

FIG. 1 is a block diagram of an embodiment of a power supply control circuit in accordance with the present invention. Prior to describing the detailed structure of the circuit of FIG. 1, the key components of the circuit will be identified followed by a brief description of the operation of the system. Then a more detailed description of each of the components will be provided along with a more detailed description of the operation.

Referring to FIG. 1, a power supply circuit in accordance with the present invention includes a power source 100, a load circuit 200, and a switching device M1 which is connected between the power source and load to control the flow of power between the power source and load in response to a drive signal. A short-circuit detector 110 is connected between the power source and load and generates a short circuit signal when the current flowing through the load exceeds a predetermined value. An opened-circuit detector 140 is connected to the load and generates an open-circuit signal when the load voltage exceeds a predetermined value. A drive signal generator 150 includes a pulse generator 152 and a logic unit 154 which combines the open-circuit signal, the latch signal, and the pulse signal, to generate a drive signal and a fault signal. A driver 160 utilizes the drive signal to control the switching device M1. A timer 120 includes a clock generator 122 which generates a periodic clock signal and a clock counter 124 which is connected to the latch 130 and generates a timer signal in response to the clock signal.

A display unit 170 is connected to the logic unit 154 and includes a display driver 172 for driving an LED in response to a fault signal from the logic unit and the clock signal from the clock generator 122.

The short-circuit detector 110 includes a current sensing resistor Rs which is connected between the power source and the load and generates a differential voltage signal commensurate with the amount of current flowing through the load. The short-circuit detector 110 also includes an over-current detector 112 which senses the differential voltage $\Delta V$ across resistor Rs and generates the short-circuit signal when a differential voltage proceeds a predetermined level.

In operation, when no fault condition exists, the logic unit 154 generates a drive signal which causes the driver 160 to turn the switching device M1 on, and current flows from the power source 100 to the load 200. In the event of an open-circuit condition, the open-circuit detector 140 generates the open-circuit signal and the logic unit 154 interrupts the drive signal which causes the driver 160 to turn off the switching device M1, thereby interrupting the flow of power to the load. In response to the open-circuit signal, the logic unit also generates a fault signal which causes the display unit 170 to generate a visible warning signal in the form of a flashing LED.

The short-circuit detector 110 continuously monitors the current flowing through the load. If the load 200 is short-circuited, the short-circuit detector 110 generates the short-circuit signal which is latched by the latch 130. The latch then generates the latch signal which causes the driver 160 to turn off the switching device M1, thereby interrupting the flow of power to the load. The latch signal also causes the logic unit 154 to generate the fault signal which causes the display unit 170 to generate a visible warning signal.

During a short-circuit condition, the timer 120 generates a timer pulse signal after a first period of time which toggles the latch signal, thereby restoring power to the load for a second predetermined period of time. If the short-circuit was only momentary, i.e. lasting for a very short period of time, the short-circuit detector no longer generates the short-circuit signal and the power supply signal automatically restarts. However, if the short-circuit condition persists, the short-circuit detector continues to generate the short-circuit signal, and the latch once again toggles the latch signal, thereby interrupting power to the load. During a persistent short-circuit condition, the timer 120 continues to generate a periodic timer pulse signal which repetitively restores and interrupt power to the load until the short-circuit condition is cleared.

Figure 2:
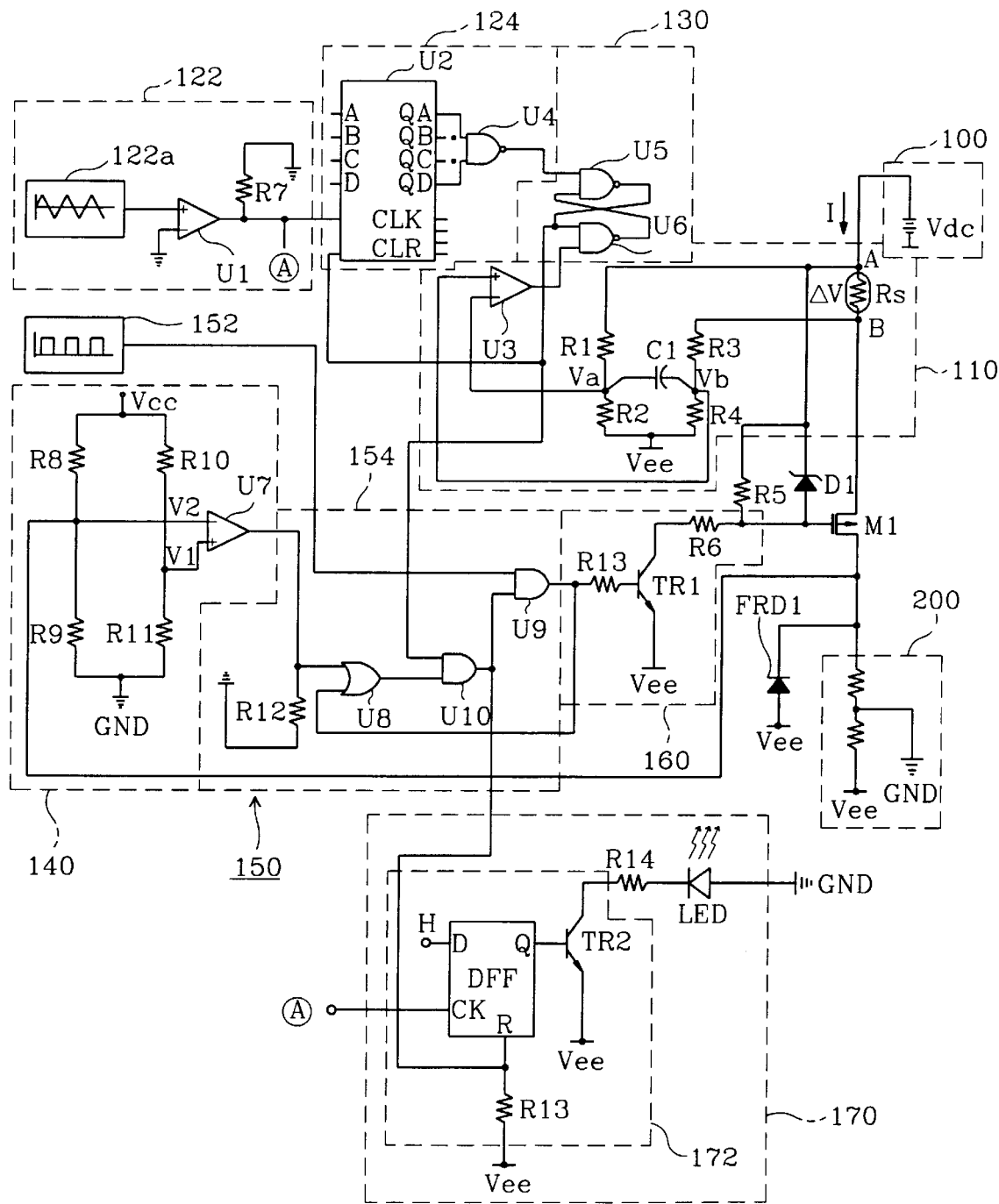
FIG. 2 is a schematic diagram showing more details of the embodiment of the power supply circuit of FIG. 1.

More detailed consideration will now be given to the structure of an embodiment of a power supply control circuit in accordance with the present invention with reference to FIG. 2. As used herein, the symbol GND indicates a ground potential, the symbol VDC indicates a power supply having a voltage greater than ground, and the symbol Vee indicates a power supply having a voltage less then ground. Referring now to FIG. 2, the power source 100 includes a battery having a voltage VDC and a positive terminal connected to a first terminal A of current sense resistor Rs which is part of the short-circuit detector 110. The switching device M1 has a controlled current path which is connected in series between a second terminal B of resistor Rs and an input terminal to the load circuit 200. The load circuit includes a first resistor coupled between the input terminal and a ground terminal and a second resistor coupled between the ground terminal and Vee.

The short-circuit detector 110 includes a bridge circuit which has a resistor R1 connected between the first terminal A of sense resistor Rs and a first current node Va, and a resistor R3 connected between the second terminal B of resistor Rs and a second current node Vb. A resistor R2 is connected between Va and Vee, and a resistor R4 is connected between Vb and Vee. The bridge circuit operates as a voltage-to-current converter. A capacitor C1 is connected between Va and Vb. An operational amplifier U3, configured as a comparator, has an inverting input terminal connected to Va and a non-inverting input terminal connected to Vb. The output terminal of U3 generates the short-circuit signal which is normally at a high-logic level when no over current condition exists.

The open-circuit detector 140 includes a bridge circuit which has a resistor R10 connected between a power supply Vcc and a first voltage node V1 and a resistor R8 connected between Vcc and a second voltage node V2. A resistor R9 is connected between V2 and ground, and a resistor R11 is connected between V1 and ground. The second voltage node V2 is connected to the input terminal of the load 200. The open-circuit detector also includes an operation amplifier U7 configured as a comparator having a non-inverting terminal (+) connected to V1, an inverting terminal (-) connected to V2, and an output terminal that generates the open-circuit signal which is normally at a high-logic level when no open-circuit condition is present.

The drive signal generator 150 includes a pulse generator 152 that generates a periodic pulse signal and a logic unit 154. The logic unit 154 includes a two input OR gate U8 which has a first input terminal connected to the output terminal of U7 to receive the open-circuit signal and a second input terminal connected to the output terminal of the logic unit 154. A resistor R12 is connected between the first input terminal of U8 and GND. A two input AND gate U10 has a first input terminal connected to the output terminal of latch 130 to receive the latch signal, a second input terminal connected to the output terminal of U8, and an output terminal that generates a fault signal. A second two input AND gate U9 has a first input terminal connected to the pulse generator 152 to receive the pulse signal, a second input terminal connected to the output terminal of U10 to receive the fault signal, and an output terminal which forms the output terminal of the logic unit 154 and generates the drive signal.

The latch 130 includes a first NAND gate U5 which has a first input terminal that receives the timer signal from the timer 120 and an output terminal that forms the output terminal of the latch 130 and generates the latch signal. A second NAND gate U6 has a first input terminal connected to the output terminal of U5, a second input terminal connected to the output terminal of U3 to receive the short-circuit signal, and an output terminal connected to the second input terminal of U5.

Figure 4:
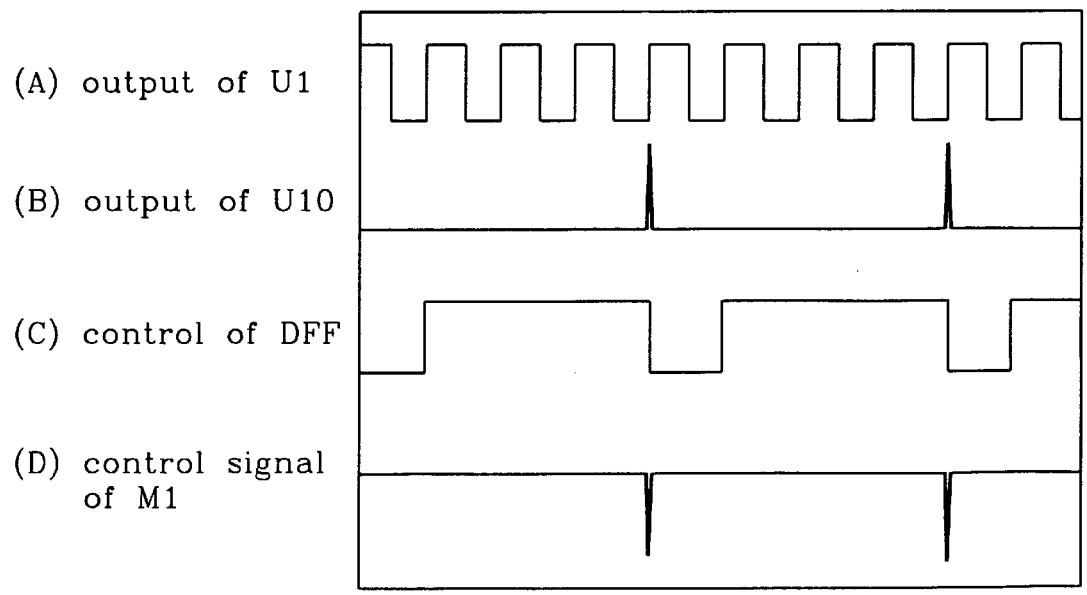
FIG. 4 is a diagram showing waveforms of signals at various points in the power supply circuit of FIG. 2 during a short-circuit condition.

The timer 120 includes a clock generator 122 which has a triangular waveform generator 122(a) and an operational amplifier U1. Amplifier U1 is configured as a comparator and has a non-inverting input terminal connected to the triangular waveform generator 122(a), and inverting input terminal connected to GND, and an output terminal that generates a clock signal shown as trace (a) of FIG. 4. Referring again to FIG. 2, the clock generator 122 also includes a resistor R7 connected between the output terminal of U1 and GND.

The timer 120 also includes a clock counter 124 which includes a counter U2 and a NAND gate U4. The counter U2 has a CLK input terminal that is connected to the output terminal of U1 to receive the clock signal, and a CLR input terminal that is connected to the output terminal of latch 130 to receive the latch signal. The counter U2 also has several output terminals QA, QB, QC, and QD. The NAND gate U4 has a first input terminal connected to the QA output of U2 and a second input terminal connected to the QD output of U2, so as to count a predetermined number of clock pulses, thereby generating the timer signal at the output terminal of U4.

The display unit 170 includes a display driver 172 and a light-emitting diode LED. The display driver 172 includes a D flip-flop DFF which has its D input terminal connected to a logic high-level, a clock input terminal CK connected to the output of U1 to receive the clock signal, and a reset input R connected to the output of U10 to receive the fault signal. A resistor R13 is connected between the R terminal of DFF and Vee. The output terminal Q of the flip-flop is connected to the base of an NPN transistor TR2. The emitter of TR2 is connected to Vee, while the collector of TR2 is connected to the cathode of the LED through a resistor R14. The anode of the LED is connected to GND.

More detailed consideration will now be given to the operation of the power supply circuit of FIG. 2.

The short-circuit detector 110 continuously monitors the current flowing through the load. A differential voltage signal is generated between terminals A and B of current sense resistor Rs and is converted to first and second voltage signals Va and Vb according to the following equations:

$$Va = [R2/(R1+R2)] \times Vdc \quad \text{(Eq. 1)}$$

$$Vb = [R4/(R3+R4)] \times (Vdc - \Delta V) \quad \text{(Eq. 2)}$$

where $\Delta V = I \times Rs [V]$. The resistance values of resistors R1 through R4 are set so that the voltage level of the second voltage signal Vb is higher then the voltage of Va during normal operation. Thus, if the load 200 is not short-circuited or open-circuited, the voltage Vb is higher then the voltage Va, and the comparator U3 always output a low-level signal.

In the open-circuit detector 140, the resistance values of resistors R8 through R11 are set so that the voltage V1 is higher then the voltage V2 during normal operation when no open-circuit condition is present. Thus, amplifier U7 outputs a high-level signal during normal operation. The voltage V2 can be obtained from the following equation:

$$V2 = (R8 \times Vcc)/(R8+R9) \quad \text{(Eq. 3)}$$

Figure 3:
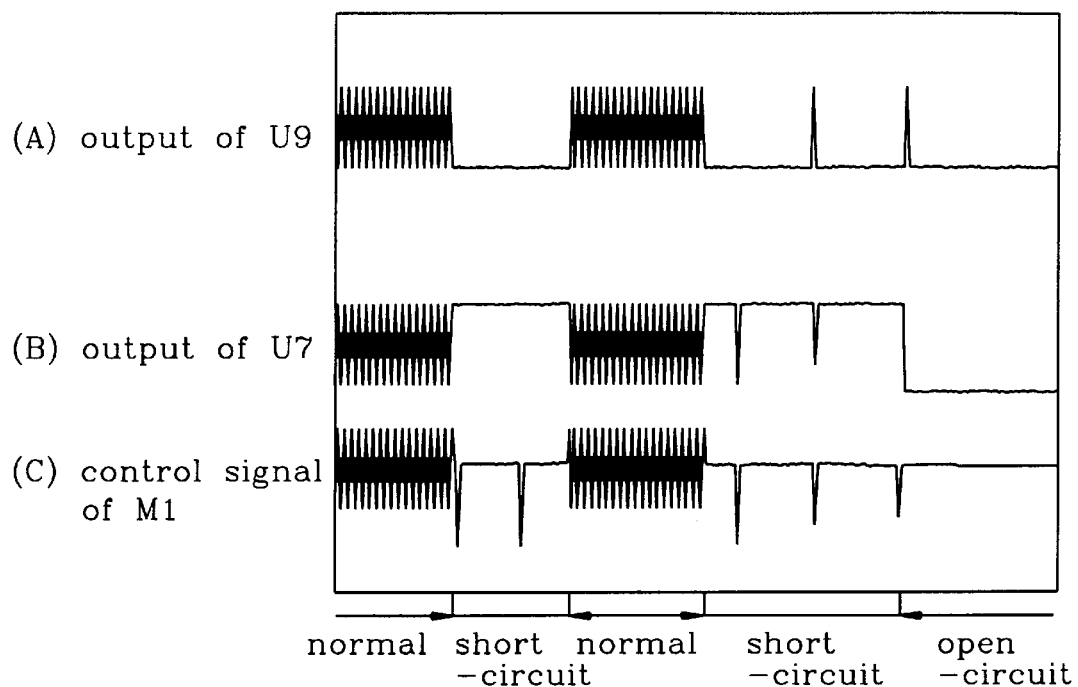
FIG. 3 is a diagram showing waveforms of signals at various points in the circuit of FIG. 2.

During normal operation, the comparator U7 outputs a high-level signal which is shown in waveform (b) of FIG. 3. This signal is provided to one input of AND gate U10 through OR gate U8. At the same time, the latch signal from the latch 130 which is at a high-logic level is provided to the other input of AND gate 10 which, therefore, generates a high-level output signal. Thus, AND gate U9 generates a drive signal which is shown in waveform (a) of FIG. 3. This in turn, turns on transistor TR1 of driver 160 which generates a switch signal shown in waveform (c) of FIG. 3, thereby turning on the switching device M1. As a result, the power source 100 is continuously connected to the load 200.

If a short-circuit occurs in the load and the current flowing through the load exceeds a predetermined level which is determined by the value of resistors R1 through R4, the voltage drop $\Delta V$ across current sense resistor Rs causes the voltage Va to become greater then the voltage Vb. This in turn, causes the output of comparator U3 to switch from a high logic level to a low-logic level, thereby causing latch 130 to generate a latch signal which has a low-logic level. The AND gate U10 then output a pulse signal as shown in waveform (b) of FIG. 4, and the AND gate U9 outputs a low level signal which turns off transistor TR1, thereby turning the switching device M1 off. As a result, the power supply from the power source 100 to the load 200 is interrupted.

During a first period of time after the interruption, the clock counter 124 of the timer 120 counts a predetermined number of clock pulses and generates a timer pulse signal which toggles the latch signal back to a high-logic level, thereby restoring power to the load for a second period of time equal to the pulse width of the timer pulse signal. If the duration of the short-circuit condition is instantaneous or considerably short, the short-circuit signal is not generated by the short-circuit detector 110 and the latch signal remains latched in a high logic state, thereby causing the drive signal to continuously turn on switching device M1 which maintains the flow of power from the power source 100 to the load 200.

If, on the other hand, the short-circuit condition persists, the short-circuit detector 110 once again generates a short-circuit signal which toggles the latch signal back to a low logic level, thereby interrupting the flow of power to the load again. The timer 120 then periodically generates the timer pulse signal as the NAND gate U4 periodically outputs a low-level signal which is provided to the NAND gate U5 of latch 130. This causes the logic circuit 154 to periodically turn on switching device M1 while the short-circuit persists. As soon as the short-circuit is removed, the power to the load is rapidly restored. Thus, if a short-circuit of the load 200 is of extremely short duration, the power supply is only interrupted for a short period of time.

To prevent the switching device M1 from being destroyed by the instantaneous over current caused by a short-circuit, the present invention includes a current limiting device to limit the current flowing through the switching device M1 to a predetermined level. The current limiting device includes a zener diode D1 having a cathode connected to the first terminal A of current sense resistor Rs and an anode connected to the control terminal of switching device M1. A resistor R5 is connected in parallel with zener diode D1. The zener diode D1 also acts as a surge protector which prevents surge voltages from being applied to the control terminal of the switching device M1 during normal operation. A free wheeling diode FRD1 is also connected in parallel with the load circuit 200.

During an open-circuit condition, the voltage V1 at the non-inverting input of comparator U7 is higher then the voltage V2 at the inverting input which causes the output of U7 which generates the short-circuit signal to switch from a high-level to a low-level signal. The AND gate U9 which receives the open-circuit signal through OR gate U8 and AND gate U10, switches from a high-level to a low-level signal which in turn causes transistor TR1 to turn off, thereby turning off switching device M1 and interrupting the flow of power to the load.

Figure 5:
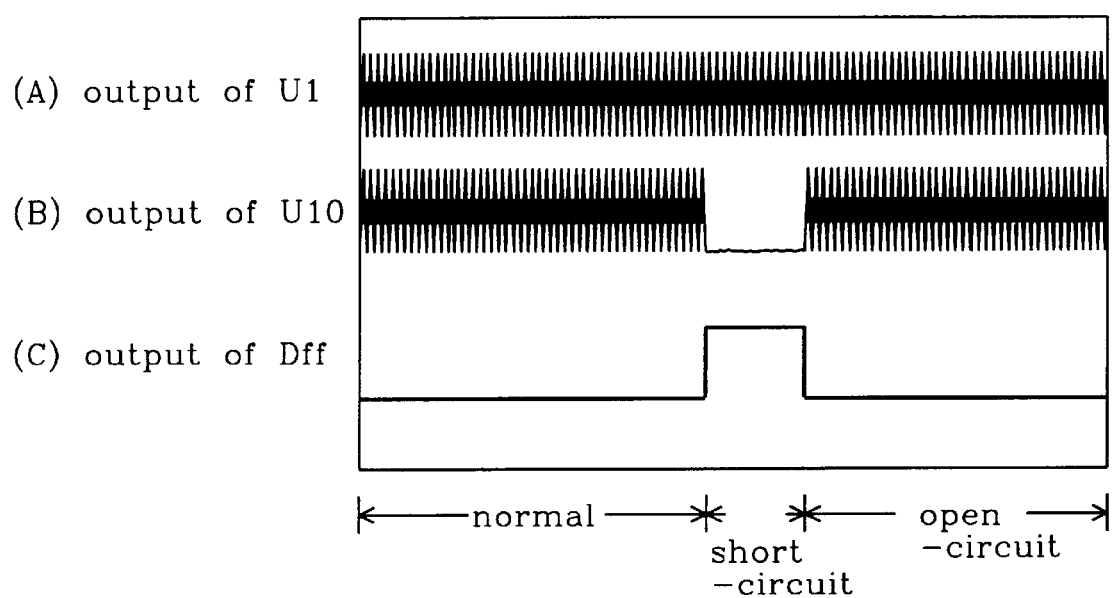
FIG. 5 is a diagram showing waveforms of signals at various points in the circuit of FIG. 2 during an open-circuit condition.
Figure 6:
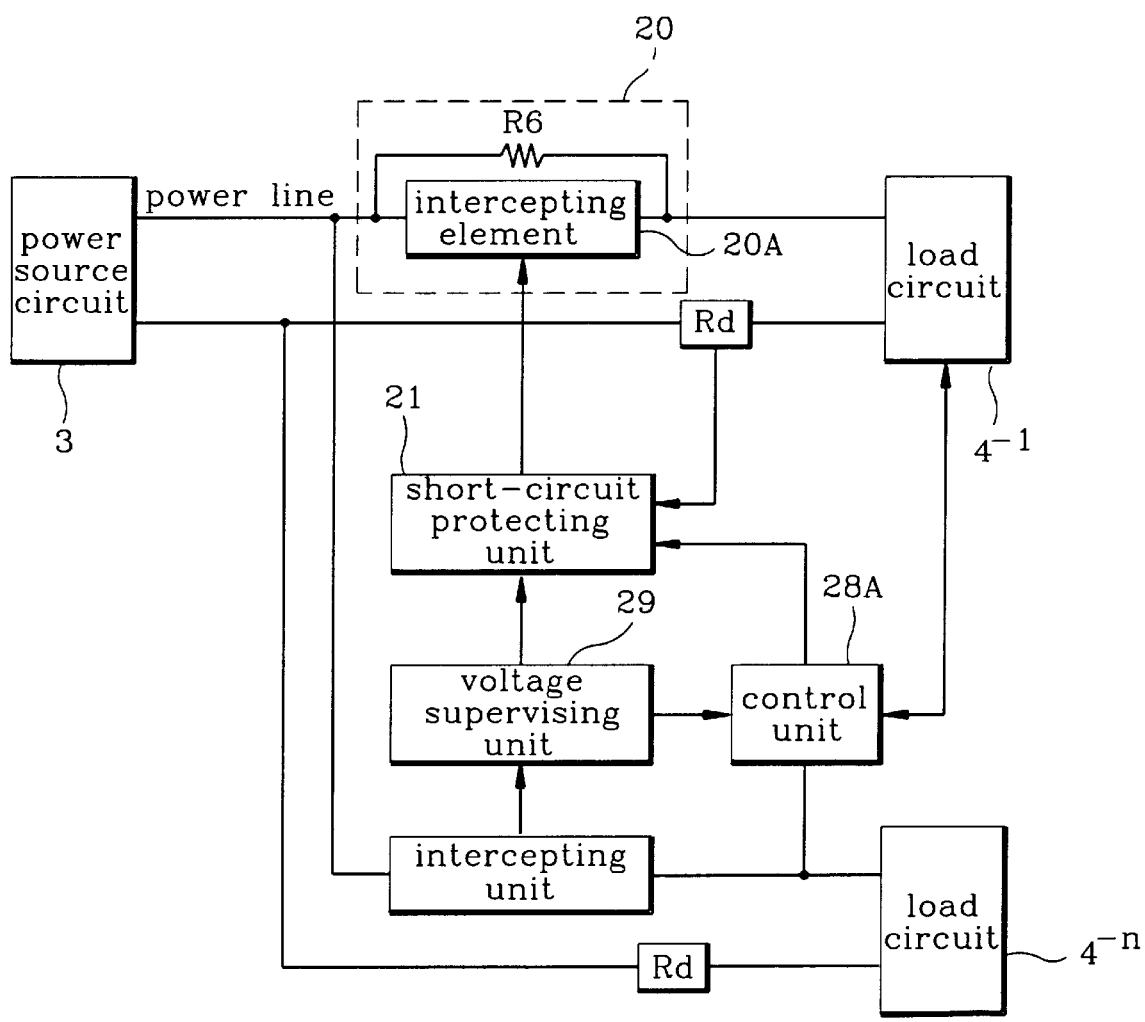
FIG. 6 is a block diagram of a prior art power supply circuit.

During a fault condition, e.g. an open-circuit or a short-circuit, AND gate U10 generates a fault signal by switching from a high-level to a low-level signal. This causes the D flip-flop DFF in the display unit 170 to output a high-level signal which is shown in waveform (c) in FIGS. 4 and 5 in response to the low-level fault signal at the output of AND gate U10 shown in waveform (b) in FIGS. 4 and 5. The high-level output from DFF turns on transistor TR2, which in turn, turns on the LED which emits a light to indicate an abnormal state such as an open-circuit or short-circuit.

An advantage of a power supply circuit in accordance with the present invention is that it interrupts the flow of power from a power source to a load when the load is short-circuited and/or open-circuited. Further, if the load is short-circuited the power supply circuit distinguishes between instantaneous and long term short-circuits and automatically restarts the power supply if the short-circuit is instantaneous. As a result, reliability of the power supply circuit is improved. Another advantage of the power supply circuit of the present invention is that it provides a visual display during an abnormal state.

Having described and illustrated the principles of the invention in a preferred embodiment thereof, it should be apparent that the invention can be modified in arrangement and detail without departing from such principles. I claim all modifications and variations coming within the spirit and scope of the following claims.

We claim:

1. A power supply circuit for controlling the flow of power from a power source to a load, the circuit comprising:

a short-circuit detector coupled to the load to monitor the current flowing through the load, the short-circuit detector generating a short-circuit signal when the current flowing through the load exceeds a predetermined level;

a timer that generates a timer signal;

a latch coupled to the short-circuit detector and the timer, the latch generating a latch signal responsive to the short-circuit signal and periodically toggling the latch signal responsive to the timer signal after the short-circuit signal is generated;

a switch coupled to the power source to control the flow of power to the load responsive to the latch signal;

a pulse generator that generates a periodic pulse signal;

an open-circuit detector coupled to the load to monitor the load voltage, the open-circuit detector generating an open-circuit signal when the load voltage exceeds a predetermined level; and a logic unit coupled to the pulse generator, the open-circuit detector, and the latch, the logic unit generating a drive signal for driving the switch responsive to the pulse signal, the open-circuit signal, and the latch signal;

wherein the logic unit includes:

an output terminal for transmitting the drive signal;

an OR gate having a first input terminal coupled to the open circuit detector to receive the open circuit signal, a second input terminal coupled to the output terminal of the logic unit to receive the drive signal, and an output terminal;

a first AND gate having a first input terminal coupled to the output terminal of the OR gate, a second input terminal coupled to the latch to receive the latch signal, and an output terminal; and a second AND gate having a first input terminal coupled to the pulse generator to receive the pulse signal, a second input terminal coupled to the output terminal of the first AND gate, and an output terminal coupled to the output terminal of the logic unit.

2. A power supply circuit for controlling the flow of power from a power source to a load, the circuit comprising:

a short-circuit detector coupled to the load to monitor the current flowing through the load, the short-circuit detector generating a short-circuit signal when the current flowing through the load exceeds a predetermined level;

a timer that generates a timer signal;

a latch coupled to the short-circuit detector and the timer, the latch generating a latch signal responsive to the short-circuit signal and periodically toggling the latch signal responsive to the timer signal after the short-circuit signal is generated;

a switch coupled to the power source to control the flow of power to the load responsive to the latch signal; and a display unit coupled to the latch, the display unit generating an alarm responsive to the latch signal;

wherein the display unit includes:

a flip-flop having a clock terminal coupled to the timer and a reset terminal coupled to the latch, the flip flop generating a display drive signal responsive to the timer signal and the latch signal; and a light emitting diode coupled to the flip-flop to generate the alarm responsive to the display drive signal.

3. A power supply circuit for controlling the flow of power from a power source to a load, the circuit comprising:

a short-circuit detector coupled to the load to monitor the current flowing through the load, the short-circuit detector generating a short-circuit signal when the current flowing through the load exceeds a predetermined level;

a timer that generates a timer signal;

a latch coupled to the short-circuit detector and the timer, the latch generating a latch signal responsive to the short-circuit signal and periodically toggling the latch signal responsive to the timer signal after the short-circuit signal is generated; and a switch coupled to the power source to control the flow of power to the load responsive to the latch signal;

wherein the timer includes:

a clock generator that generates a periodic clock signal; and a clock counter coupled to the clock generator to receive the clock signal, the clock counter generating the timer signal responsive to the clock signal.

4. A power supply circuit according to claim 3 wherein the clock counter includes:

a counter having an input terminal coupled to the clock generator to receive the clock signal and a plurality of counter output terminals; and a NAND gate having a plurality of input terminals coupled to the plurality of counter output terminals and an output terminal for transmitting the timer signal.

5. A power supply circuit for controlling the flow of power from a power source to a load, the circuit comprising:

a short-circuit detector coupled to the load to monitor the current flowing through the load, the short-circuit detector generating a short-circuit signal when the current flowing through the load exceeds a predetermined level;

a timer that generates a timer signal;

a latch coupled to the short-circuit detector and the timer, the latch generating a latch signal responsive to the short-circuit signal and periodically toggling the latch signal responsive to the timer signal after the short-circuit signal is generated; and a switch coupled to the power source to control the flow of power to the load responsive to the latch signal;

wherein the short-circuit detector includes:

a current sensing resistor coupled to the load; and an over-current detector coupled to the current sensing resistor; and wherein the over-current detector includes:

an operational amplifier having an inverting input terminal coupled to a first current node, a non-inverting input terminal coupled to a second current node, and an output terminal for transmitting the short-circuit signal;

a first resistor coupled between a first terminal of the current sensing resistor and the first node;

a second resistor coupled between the first node and a ground terminal;

a third resistor coupled between a second terminal of the current sensing resistor and the second node;

a fourth resistor coupled between the second node and the ground terminal; and a capacitor coupled between the first and second nodes.

6. A power supply circuit for controlling the flow of power from a power source to a load, the circuit comprising:

a short-circuit detector coupled to the load to monitor the current flowing through the load, the short-circuit detector generating a short-circuit signal when the current flowing through the load exceeds a predetermined level;

a timer that generates a timer signal;

a latch coupled to the short-circuit detector and the timer, the latch generating a latch signal responsive to the short-circuit signal and periodically toggling the latch signal responsive to the timer signal after the short-circuit signal is generated;

a switch coupled to the power source to control the flow of power to the load responsive to the latch signal;

an open-circuit detector coupled to the load to monitor the load voltage, the open-circuit detector generating an open-circuit signal when the load voltage exceeds a predetermined level; and a logic unit coupled to the open-circuit detector and the latch, the logic unit generating a drive signal for driving the switch responsive to the open-circuit signal and the latch signal;

wherein the open circuit detector includes:

an operational amplifier having an inverting input terminal coupled to the load at a first voltage node, a non-inverting input terminal coupled to a second voltage node, and an output terminal for transmitting the open circuit signal;

a first resistor coupled between a power supply terminal and the first voltage node;

a second resistor coupled between the first voltage node and a ground terminal;

a third resistor coupled between the power supply terminal and the second voltage node; and a fourth resistor coupled between the second voltage node and the ground terminal.

7. A power supply circuit for controlling the flow of power from a power source to a load, the circuit comprising:

a short-circuit detector coupled to the load to monitor the current flowing through the load, the short-circuit detector generating a short-circuit signal when the current flowing through the load exceeds a predetermined level;

a timer that generates a timer signal;

a latch coupled to the short-circuit detector and the timer, the latch generating a latch signal responsive to the short-circuit signal and periodically toggling the latch signal responsive to the timer signal after the short-circuit signal is generated;

a switch coupled to the power source to control the flow of power to the load responsive to the latch signal; and a resistor and a voltage clamping device coupled in parallel between the short-circuit detector and the switch so as to limit the current flowing through the switch to a predetermined level.

8. A power supply circuit for controlling the flow of power from a power source to a load, the circuit comprising:

a short-circuit detector coupled to the load to monitor the current flowing through the load, the short-circuit detector generating a short-circuit signal when the current flowing through the load exceeds a predetermined level;

a timer that generates a timer signal;

a latch coupled to the short-circuit detector and the timer, the latch generating a latch signal responsive to the short-circuit signal and periodically toggling the latch signal responsive to the timer signal after the short-circuit signal is generated; and a switch coupled to the power source to control the flow of power to the load responsive to the latch signal;

wherein the latch includes:

a first NAND gate having a first input terminal for receiving the timer signal, a second input terminal, and an output terminal for transmitting the latch signal; and a second NAND gate having a first input terminal coupled to the output terminal of the first NAND gate, a second input terminal for receiving the short-circuit signal, and an output terminal coupled to the second input terminal of the first NAND gate.

9. A power supply circuit for controlling the flow of power from a power source to a load, the circuit comprising:

a switch for controlling the flow of current from the power source to the load;

means for generating a short-circuit signal when the current flowing through the load exceeds a predetermined level;

latch means for turning the switch off responsive to the short-circuit signal;

timer means for periodically turning the switch on after the short-circuit signal has been generated;

means for generating an open-circuit signal when the load voltage exceeds a predetermined value; and logic means for combining the short-circuit signal and the open-circuit signal to generate a drive signal for controlling the switch.

10. A method for controlling power to a load comprising:

supplying power to the load;

monitoring the current flowing through the load;

generating a short-circuit signal when the current flowing through the load exceeds a predetermined level;

latching the short-circuit signal to generate a latch signal;

interrupting power to the load responsive to the latch signal;

restoring power to the load after a first period of time;

generating a clock signal having pulses; and counting a predetermined number of the clock signal pulses, thereby determining the length of the first period of time.

\* \* \* \* \*